Nov. 19, 1968  J. R. RAWLEY  3,412,215
DIGITAL-TO-AUDIO READOUT SYSTEM
Filed Dec. 21, 1964
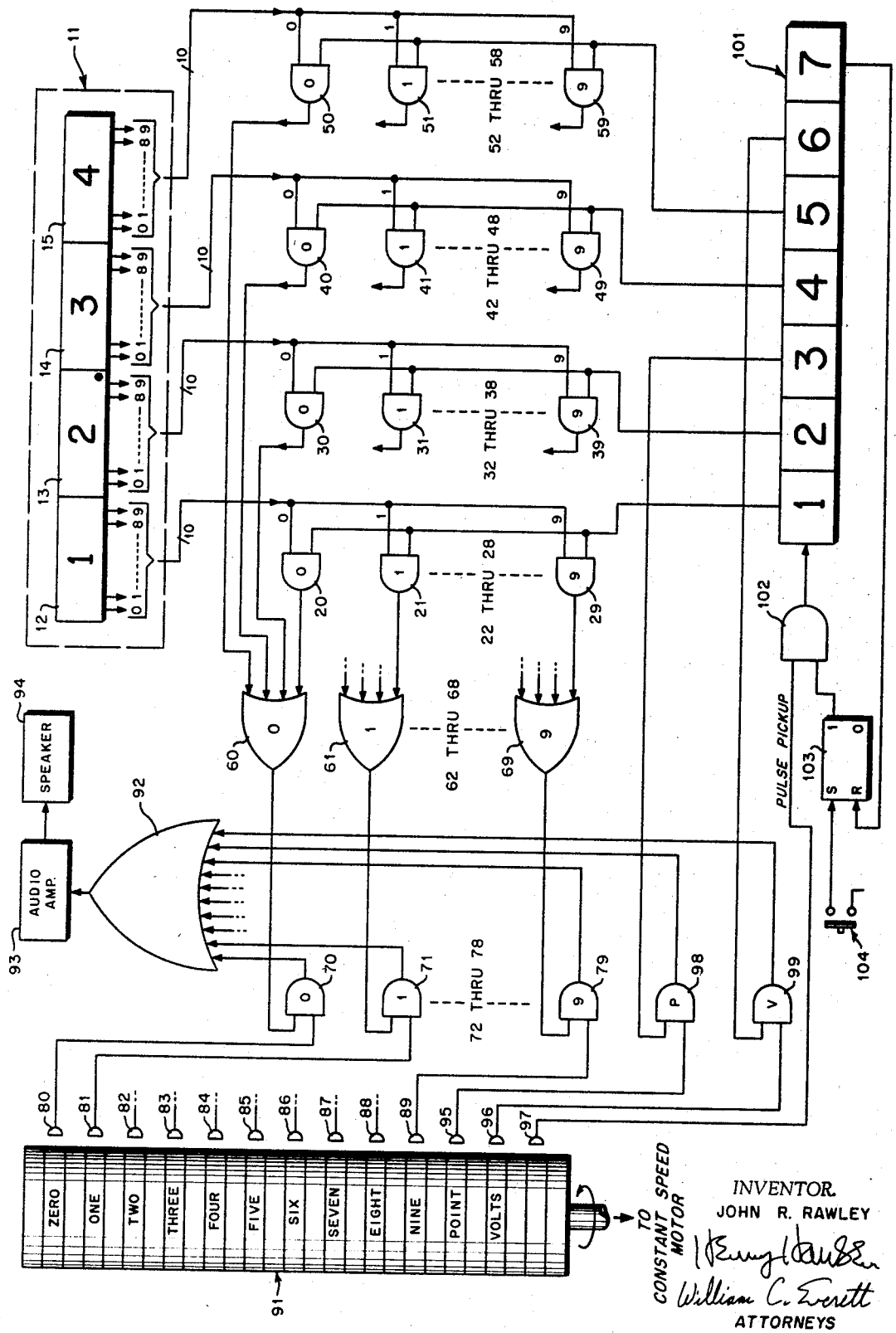
INVENTOR.
JOHN R. RAWLEY
ATTORNEYS United States Patent Office 3,412,215
Patented Nov. 19, 1968

3,412,215
DIGITAL-TO-AUDIO READOUT SYSTEM
John R. Rawley, 1838 Rockwell Road,
Abington, Pa. 19001
Filed Dec. 21, 1964, Ser. No. 420,229
1 Claim. (Cl. 179—100.2)

ABSTRACT OF THE DISCLOSURE

A device for audibly indicating the output signal of a digital voltmeter having four parallel output stages which includes a recorder having a plurality of parallel, endless recording tracks upon which are prerecorded a clock pulse, "point," "volts" and the numerals corresponding to the respective numeral assigned to each of the plural output bits in a given voltmeter output stage. The device includes a seven stage ring counter whose output stages each provide an output signal in sequence in response to a series of clock pulses derived from the clock track and applied thereto by an AND gate enabled by a flip-flop which is reset by the last stage of the counter. The counter output signals are applied to enable successive banks of AND gates, the AND gates of each of the banks which are connected to the output bit assigned the same numeral being connected through an OR gate to enable a gate connected to an amplifier and speaker and associated with the pick-up sensing the corresponding numeral.

The invention described herein may be manufactured and used by or for the Government of the United States of America for governmental purposes without the payment of any royalties thereon or therefor.

The present invention relates to a digital-to-audio converter and more particularly to a readout instrument for converting the reading on a digital visual measuring instrument into an audible voice signal which may be heard by an operator.

In the field of measuring instruments in general and aircraft cockpit instrument panels in particular, it has been the practice to employ visual instruments exclusively. With the increasing complexity of electronic devices of all kinds it has become increasingly prevalent that the operator of a machine such as, for example, an aircraft will be faced with a large bank of measuring instruments of various kinds which he must read periodically in order to operate the machine. With the increasing complexity of machines, operators have experienced greater difficulty in reading the dials of instruments without error and in some cases have neglected entirely to read some of the instruments in a series that must be read in order to operate the machine properly. Mistakes that may be made are the reading of one dial as another or the reading of a wrong number from the face of the dial. To make a reading correctly, each dial must be located and its condition noted, in conditions sometimes of great tension or of low light level, as frequently occurs in an airplane cockpit.

The general purpose of this invention is to provide an audio converter which provides an audio readout from a single instrument or a bank of instruments upon demand by the operator, which the operator can hear as well as see. Since each audio readout automatically includes the parameters of which it is a measurement, the possibility of mistaking one dial for another is greatly diminished. To attain this, the present invention provides a recording instrument, such as a magnetic drum, on which the numbers 0 to 9, plus such other parameters as may be necessary, are recorded. Each number or parameter is recorded at a separate space on the drum and the drum is cycled continuously. Means are provided next to the drum to pick up each word from the drum as the drum rotates. Logic means are connected to the measuring instrument and to a timing instrument for connecting the appropriate sections of the drum in the proper sequence to an audio amplifier and speaker so that upon demand of the operator each of the appropriate sections of the drum according to the condition of the measuring instrument will be read out into the speaker, the result of which will be a voice message telling the operator the condition of the measuring instrument. If desired, the logic and timing devices may be hitched up to read several instruments in a predetermined sequence upon a single request from the operator. By this means, inadvertent omission of some instruments is also avoided.

Accordingly, it is an object of the present invention to provide an audio converter for a digital measuring instrument, whereby the condition of the instrument is heard audibly by the operator.

Another object of the invention is to provide a digital to audio converter whereby upon the request of the operator the condition of one or a sequence of instruments will be read out audibly in a predetermined sequence.

A further object of the invention is the provision of a digital to audio converter in which words recorded on a magnetic drum are picked in a sequence determined by the condition of one or a plurality of measuring instruments and passed through reed relays to an audio speaker.

Other objects and many of the attendant advantages of this invention will be readily appreciated as the same becomes better understood by reference to the following detailed description when considered in connection with the accompanying drawing wherein:

The figure shows a block schematic diagram of the circuit of a digital to audio converter according to the invention.

In the figure there is shown a measuring instrument 11, which may be of any type whatever, for example, a voltmeter, as shown in the figure. It may also be an altimeter, a clock, a distance measuring device, a tachometer, a gasoline gage, or a measuring device for any other purpose whatever, provided its readout is expressed in digital form. In the specific embodiment shown, there are four stages 12, 13, 14, 15 to the meter 11. In the embodiment shown there is a decimal point between the first two and the last two stages.

Each of the stages 12, 13, 14 and 15 has ten outputs comprising respectively the figures 0 through 9 representing the ten possible conditions of that stage of the meter. The ten outputs of the first stage feed into a set of ten AND gates 20 through 29. The ten conditions of the second meter 13 feed into a set of ten AND gates 30 through 39. The ten conditions of the third stage 14 feed into a third set of AND gates 40 through 49, and the ten conditions of the fourth stage feed into a fourth set of AND gates 50 through 59. It will be seen that in the operation of the device only one of each bank of ten AND gates will be actuated at any one time and the one actuated will depend upon the condition of that stage of the meter.

The four AND gates 20, 30, 40 and 50, connected respectively to the zero conditions of stages 12, 13, 14 and 15 of meter 11, are all linked to a zero OR gate 60. The one gates of each of the four banks of AND gates 20 through 29, 30 through 39, 40 through 49, and 50 through 59 are similarly connected to a one OR gate 61. Further OR gates 62 through 69 are similarly connected to each of the other respective stages of the four banks of AND gates. The outputs of each of the OR gates 60 through 69 are connected in turn to a further bank of AND gates 70 through 79 which in turn are connected to a bank of read heads 80 through 89. Read heads 80 through 89 are associated with ten tracks on a magnetic drum 91 which is turned at a constant speed by a constant speed motor (not shown).

The outputs of AND gates 70 through 79 are fed into an OR gate 92, the output of which is fed into an audio amplifier 93 and thence to a speaker 94. Further provided in association with the drum are three read heads 95, 96 and 97. Read heads 95 and 96 are for various parameters to be used with the instrument as desired. They feed respectively into a pair of AND gates 98 and 99 which also feed into OR gate 92. Read head 97 is a pulse pickup for locating a predetermined reference point on the magnetic drum for reasons to be explained subsequently.

Controlling each of the four banks of AND gates 20 through 29, 30 through 39, 40 through 49, and 50 through 59 is a ring counter 101 different stages of which are connected to different banks of AND gates as shown in the figure. Two of the stages of the ring counter are connected respectively to gates 98 and 99, as shown, to actuate them in the proper sequence. Ring counter 101 is advanced by pulse inputs from an AND gate 102. AND gate 102 receives pulses from pulse pickup 97 and will pass them on to the ring counter 101 when it is enabled by a flip-flop 103. Flip-flop 103 is set "on" by a signal through a push button 104 operated by an operator and is reset "off" by a signal from the last stage of ring counter 101.

The operation of the embodiment shown in the figure is as follows. When the operator desires to initiate an audio readout of meter 11 he pushes button 104 which sets flip-flop 103 to the "on" position. This enables AND gate 102 which then will pass the pulses which are picked up from the magnetic drum 91 by read head 97 at the commencement of each set of words. The first pulse that comes through AND gate 102 will set ring counter 101 on the first stage. This will cause the first bank of AND gates 20 through 29 to be enabled. There will be an output from one of these gates depending on the condition of the first stage 12 of meter 11. Whichever AND gate in the first bank is enabled will pass a signal through to the corresponding AND gate in the bank 70 through 79 and the enabling of that gate will enable the pickup from the magnetic drum to be carried through the appropriate AND gate to OR gate 92 and thence to audio amplifier 93 and speaker 94 in succession where it will be heard on speaker 94. On the next revolution of the magnetic drum another pulse will come through read head 97 through AND gate 102 to advance ring counter 101 to the second stage. This will actuate the second bank of AND gates 30 through 39 whereupon the condition of the second stage 13 of the meter will similarly actuate one of the AND gates 70 through 79 to readout the appropriate condition into speaker 94. In the third stage of the specific embodiment shown AND gate 98 is actuated to read out the word "point" into speaker 94. The fourth stage reads out the condition of stage 14 of meter 11. The fifth stage of ring counter 101 reads out the fifth stage 15 of meter 11. The sixth stage of ring counter 101 actuates gate 99 which reads the word "volts" into speaker 94. The seventh stage of ring counter 101 will shut off flip-flop 103 until it is re-actuated. If it is assumed, for example, that the reading on meter 11 is 12.73 volts, the result of the foregoing operation will be a voice message on speaker 94 comprising "one . . . two . . . point . . . seven . . . , three . . . volts." The amount of time taken to rotate one revolution of drum 91 will be chosen as essentially the time to speak one word so that there is not a significant wait between words which could greatly slow down the speed of reading the instrument and thereby destroy the purpose of the audio readout.

If the meter in question has more or less than four stages in it there will be more or less than four banks of AND gates. If there are more or less than two words such as "points" and "volts" desired to be read out with the numerical information, there will be more or less than two tracks reserved on the magnetic drum 91 for such words. In any event, there will be ten tracks reserved for the digit 0 through 9 plus as many tracks as desired reserved for specific parameters to be read out in the predetermined order. If there are a plurality of instruments to be read in succession, there must be a bank of AND gates and a stage of the ring counter 101 for each stage of each instrument to be read, as well as a track reserved on the magnetic drum for each of the parameters in each of the various meters. The length of the ring counter instead of being 7 long will be one more than the total number of banks and parameter words to be read out in the sequence.

In place of the magnetic drum there may be any form of recording device. For example, a record disk with a plurality of needles set in circular grooves will be equally operative so long as there is a pickup device of some kind for every word to be read out and so long as the rotation of the recording device is timed to be approximately the length of one word. The operation of the device will be essentially the same. However, the use of a magnetic drum has been found to be efficient and compact and the use of it with magnetic read heads is found to be advantageous.

In the AND gates 70 through 79, 98 and 99 the ordinary solid state logic AND gate is not acceptable. Gates must be used here which are capable of passing an analog signal such as an audio voice message. A type of gate found to be advantageous is a reed relay which is inexpensive, light and silent in operation. Such a relay would be activated by the signal from one of the OR gates 60 through 69 or from ring counter 101, and the audio message would be passed through when the relay was activated. OR gate 92 may be a direct connection of all of the inputs to a single output or it may be a kind of logic gate which will pass audio signals through all of its inputs. The logic gates 20 through 69 may be the normal solid stage logic devices, or they too may be reed relays or any other form of logic device having the requisite logic function. Ring counter 101 may be replaced by any other form of counting device which has successively activated stages advanced by pulse inputs. It may also have a counter comprising a digital counter with sets of appropriate logic gates for activating successive AND gates in sequence. Other devices possible are staggered signal reduction gears connected to the magnetic drum. Another means is a step relay actuated by a step impulse from the drum once each revolution. This is the least complex and least costly and provides excellent reliability but has a drawback of large size and weight.

If further reliability of the ring counter 101 is desired, the start pulse from push button 104 may be connected to the reset positions of stages 1 through 6 and set position of stage 7 of ring counter 101.

If the measuring instrument 11 is one which has a variable decimal point depending on the number of significant figures before the decimal point, additional logic circuits from the measuring instrument 11 can be utilized to actuate the word "point" on magnetic drum 91 at different selected stages of the ring counter 101, so that the word "point" will be read after the third stage of measuring instrument 11, for example, rather than after the second stage.

The speaker 94 may be of any kind whatever. Specifically it may be either a wall speaker or room loud speaker, or it may be the earphones of a pilot's radio set.

Obviously, many modifications and variations of the present invention are possible in the light of the above teachings. It is therefore to be understood that within the scope of the appended claims the invention may be practiced otherwise than as specifically described.

What is claimed is:

1. Apparatus for providing an audible indication of the parallel digital output signal of a digital output signal of a digital device having N output stages, each stage having a plurality of output bits for providing an electrical signal, each bit signifying a respective assigned predetermined message, said apparatus comprising:

a ring counter having an input terminal and at least $N+1$ cascaded stages, said ring counter being responsive to a series of input clock pulses for providing an electrical counter stage output signal from each of its stages in sequence;

flip-flop means providing an output signal when set and connected to be reset by said counter stage output signal of the last stage of said ring counter;

means connected for applying a signal to set said flip-flop means;

N banks of AND gates for providing electrical output signals, each of said AND gates in a bank having an input arranged for receiving one of its electrical input signals from a respective output bit in an associated stage of the digital device, said AND gates of successive said banks each being connected to said counter for receiving as another of its electrical input signals the same said counter stage output signal from the correspondingly successive stages of said ring counter;

a plurality of OR gate means for providing respective electrical gate enable signals, each said OR gate means being connected for receiving said output signals of those said AND gates of said banks which have their said inputs arranged for receiving the electrical input signals from the digital device output bits assigned the same predetermined message;

recorder means having a plurality of endless recording tracks, one of said tracks having a clock pulse prerecorded thereon and others of said tracks each having a respective one of the assigned predetermined messages prerecorded thereon;

means including a clock pickup and an AND gate connected to said clock pickup and connected to be enabled by said flip-flop means when set for providing clock pulses to said input terminal of said ring counter;

a plurality of message pickups each associated with a respective message track for sensing and providing a respective message signal;

a plurality of gates each connected to a respective message pickup and to a respective one of said OR gates for passing said message signal in response to said gate enable signal; and sound reproduction means connected to said gates for audibly indicating said message signals applied thereto.

References Cited

UNITED STATES PATENTS 3,081,431    3/1963    Werner et al.    179—100.2 X
3,212,059    10/1965    Eldridge    179—6 X

FOREIGN PATENTS 1,129,299    5/1962    Germany.

BERNARD KONICK, *Primary Examiner.*

R. F. CARDILLO, *Assistant Examiner.*